(12) United States Patent
Miller et al.

(10) Patent No.: US 9,810,343 B2
(45) Date of Patent: Nov. 7, 2017

(54) PRESSURE COMPENSATED FLOW TUBE FOR DEEP SET TUBULAR ISOLATION VALVE

(71) Applicant: BAKER HUGHES INCORPORATED, Houston, TX (US)

(72) Inventors: Wade A. Miller, Broken Arrow, OK (US); John E. Burris, Bixby, OK (US); Michael L. Hair, Tulsa, OK (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 15/066,892

(22) Filed: Mar. 10, 2016

(65) Prior Publication Data
US 2017/0261120 A1    Sep. 14, 2017

(51) Int. Cl.
| | | |
|---|---|---|
| *E21B 34/10* | (2006.01) | |
| *E21B 43/12* | (2006.01) | |
| *F16K 31/122* | (2006.01) | |
| *E21B 34/00* | (2006.01) | |

(52) U.S. Cl.
CPC .......... *F16K 31/1223* (2013.01); *E21B 34/10* (2013.01); *E21B 43/12* (2013.01); *E21B 2034/005* (2013.01)

(58) Field of Classification Search
CPC .... E21B 34/10; E21B 2034/005; E21B 43/12; F16K 31/1223
See application file for complete search history.

(56) References Cited

U.S. PATENT DOCUMENTS

| | | | |
|---|---|---|---|
| 3,077,179 A | | 2/1963 | Evanson |
| 4,444,266 A | * | 4/1984 | Pringle ................... E21B 34/10 166/321 |
| 5,058,682 A | * | 10/1991 | Pringle ................. E21B 34/101 166/324 |
| 5,415,237 A | * | 5/1995 | Strattan ................... E21B 34/10 166/324 |
| 5,465,786 A | * | 11/1995 | Akkerman .............. E21B 34/06 166/323 |
| 5,682,921 A | | 11/1997 | Rawson et al. |
| 5,890,450 A | | 4/1999 | Hamell et al. |
| 5,918,858 A | | 7/1999 | Rawson et al. |
| 6,041,857 A | | 3/2000 | Carmody et al. |
| 6,173,785 B1 | | 1/2001 | Adams et al. |
| 6,328,062 B1 | | 12/2001 | Williams et al. |
| 7,392,849 B2 | * | 7/2008 | Lauderdale ............. E21B 34/10 166/324 |
| 7,533,693 B2 | | 5/2009 | Colton, Jr. et al. |

(Continued)

*Primary Examiner* — Matthew R Buck
(74) *Attorney, Agent, or Firm* — Steve Rosenblatt

(57) ABSTRACT

The annular space surrounding a flow tube in a subsurface safety valve is sealingly isolated at opposed ends of the flow tube and pressure compensated to the tubing pressure. The subsurface safety valve is inserted and aligned in an outer housing so that hydraulic operating connections are sealingly aligned with opposite hand split ring seals that are properly compressed when the safety valve is secured in its surrounding housing. The assembly is then able to meet high pressure, heavy debris, and marine environment service requirements for subsea conditions with minimal reconfiguration for what would otherwise serve as a borehole subsurface safety valve.

32 Claims, 12 Drawing Sheets

(56) References Cited

U.S. PATENT DOCUMENTS

| | | | | |
|---|---|---|---|---|
| 7,591,317 | B2* | 9/2009 | Bane | E21B 34/10 |
| | | | | 166/321 |
| 7,743,833 | B2* | 6/2010 | Cascario | E21B 34/10 |
| | | | | 166/332.8 |
| 7,779,925 | B2* | 8/2010 | Jacob | E21B 33/10 |
| | | | | 166/192 |
| 7,896,082 | B2* | 3/2011 | Lake | E21B 34/10 |
| | | | | 166/332.8 |
| 8,176,975 | B2* | 5/2012 | Lake | E21B 34/06 |
| | | | | 166/250.01 |
| 9,212,536 | B2* | 12/2015 | Biddick | E21B 34/06 |
| 2006/0157240 | A1 | 7/2006 | Shaw et al. | |
| 2012/0234410 | A1 | 9/2012 | Borchgrevink et al. | |
| 2013/0043039 | A1* | 2/2013 | Sloan | E21B 34/10 |
| | | | | 166/373 |
| 2016/0138365 | A1* | 5/2016 | Vick, Jr. | E21B 34/14 |
| | | | | 166/375 |

* cited by examiner

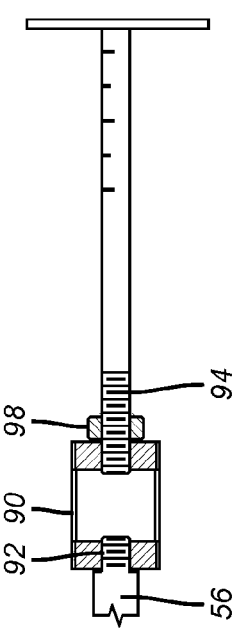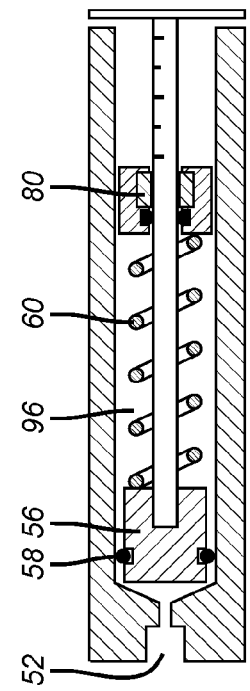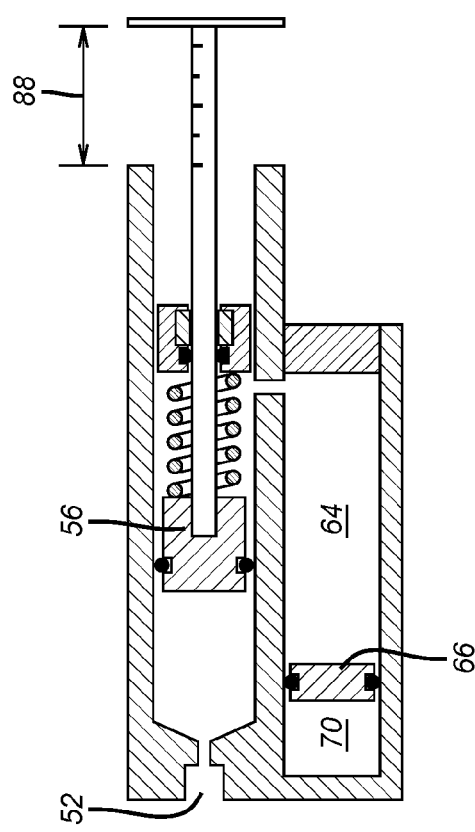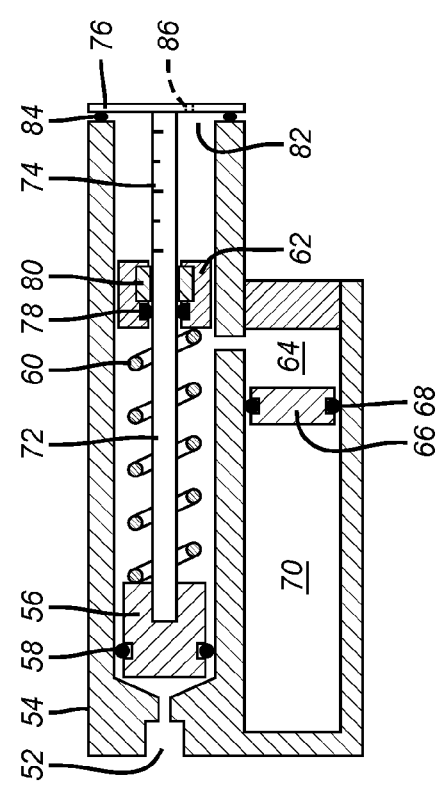

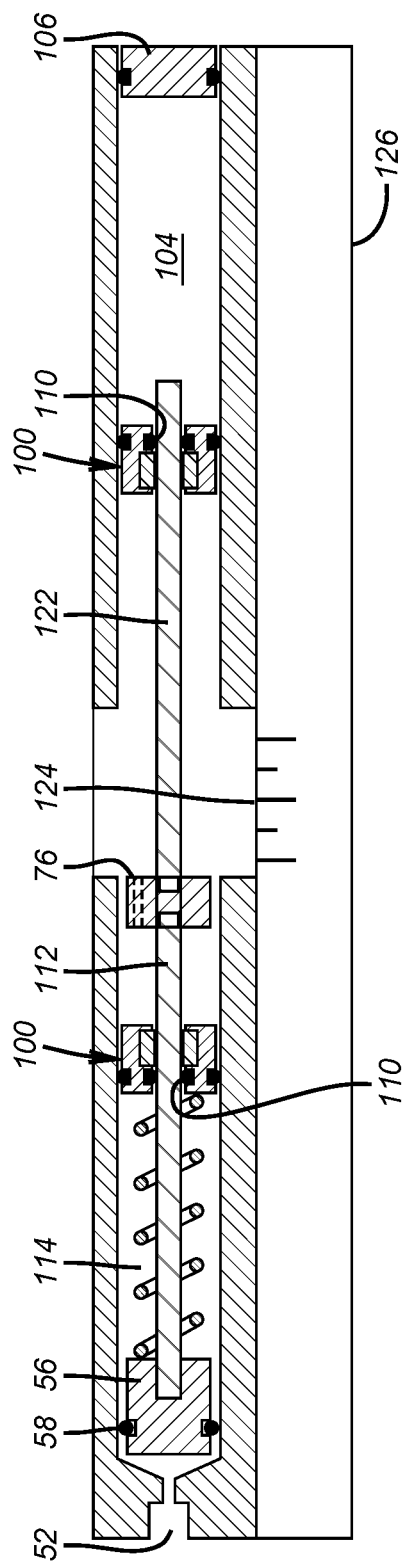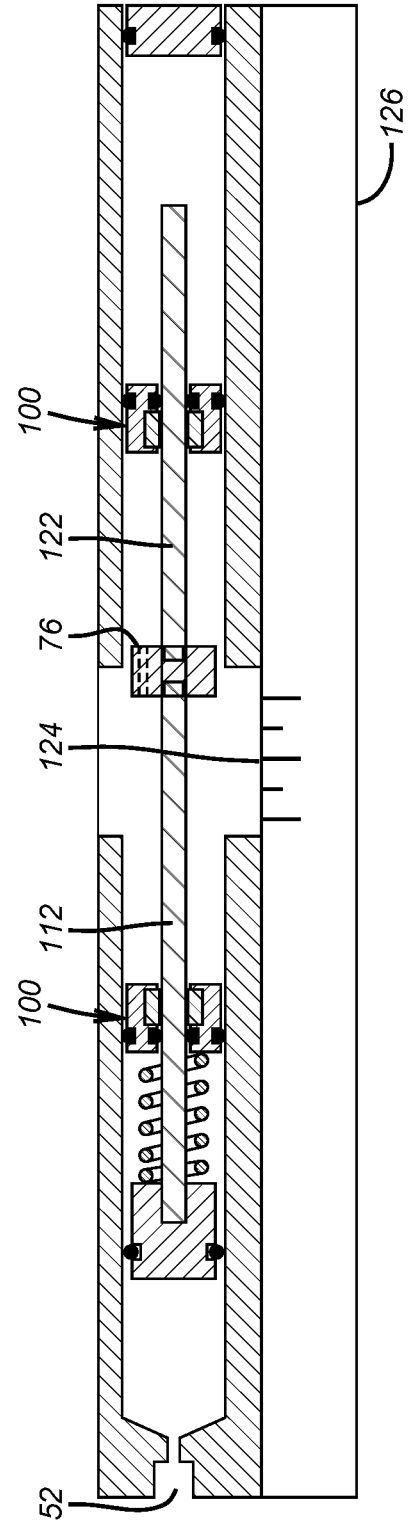

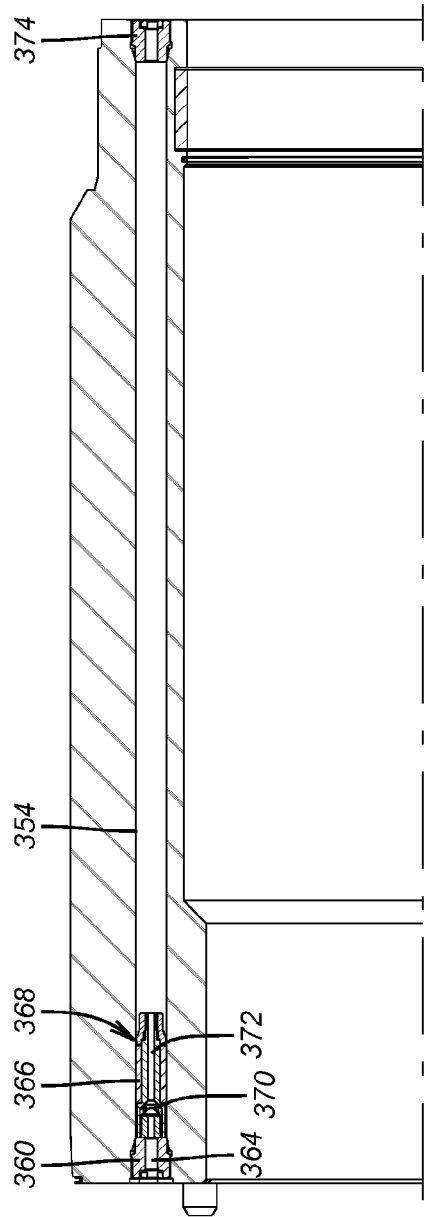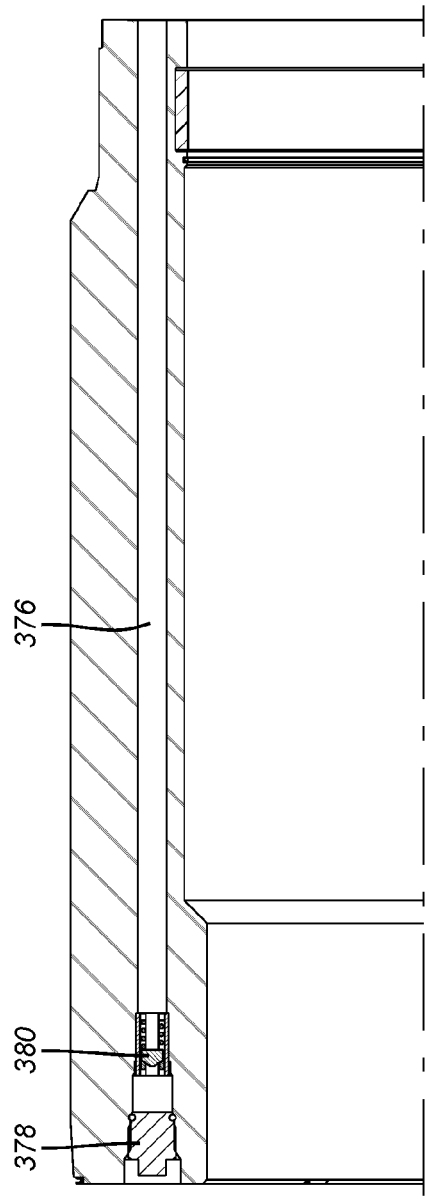

PRESSURE COMPENSATED FLOW TUBE FOR DEEP SET TUBULAR ISOLATION VALVE

FIELD OF THE INVENTION

The field of the invention a flow tube operated flapper type safety valve and more particularly a sealed annular cavity containing the valve's operating system to isolate the system from contact with production fluids and/or solids and thereby increase the reliability and longevity of the system. The field of the invention also includes a pressure compensation system to continually balance the pressure within the sealed annular cavity to the pressure of the internal production fluids within the valve (at any given pressure within valve's operating range). As a result of the pressure compensation system, the hydraulic operating pressures required to function the valve open are greatly reduced due to the pressure balance. As well, the valve's thru-bore size can be increased for maximized production flow rates since the flow tube is no longer designed to withstand a significant pressure differential. Finally the field of the invention includes a load bearing outer housing configuration to allow ready reuse of borehole safety valves in high pressure and/or high debris subsea applications.

BACKGROUND OF THE INVENTION

A context reference for the present invention is Pressure-Balanced Rod Piston Control System for a Subsurface Safety Valve U.S. Pat. No. 6,173,785 B1. The operating mechanism for the isolation valve for subsea use will be very similar to that which is shown in FIGS. 1 and 2 of this patent.

In fact, the pressure balance functionality of the operating mechanism unchanged; however, with the present invention the annular space surrounding the operating mechanism will be fully isolated from exposure to production fluids and solids (asphaltenes, paraffins, scale, etc.) and instead filled completely with a clean lubricating fluid increasing the service life of all moving parts. Isolation is enabled by integrating annular seals about the flow tube at the top and bottom end of the surrounding annular space. The annular space will be pressure compensated to internal tubing pressure to eliminate the buildup of pressure differential across the flow tube. In doing so the seal friction associated with the seals about the flow tube, which is exacerbated by increased pressure differential (thereby energizing the seals), will be minimized and will thus result in lower hydraulic control line requirements (i.e. operating pressures) for the valve. Further a safety valve designed for borehole applications is adapted for applications requiring resistance to tension, compression and bending loads, external exposure to subsea environments, and high pressure/high temperature service by utilizing a uniquely configured flanged outer housing into which the borehole safety valve is inserted, rotationally aligned for optimal closure mechanism performance, and secured with hydraulic control lines through the housing aligned and sealed to the control line connections on the borehole safety valve.

Traditional flapper style subsurface safety valves are known to suffer from debris related issues in downhole production environments. These issues can come in various forms and can range from mechanical fouling, caused by the accumulation of sand in the annular spring cavity, to piston or flow tube sticking caused by the solidification of heavy asphaltene or paraffin formations in the same region. Issues such as these can be extremely costly to operators given that their mitigation traditionally requires an intervention, at a minimum, and often times a full work-over to pull and replace the valve and/or completion. In the context of isolation valves for use within subsea production environments (i.e. installations within subsea production risers), the threat of debris fouling is exponentially increased. This is primarily attributable to the decrease in temperature and pressure of the production fluids as they travel through long stretches of Production Risers normally exposed to the cold marine environments. Consequently, waxes (paraffins) and other organic solids (such as asphaltenes) are known to precipitate out of production fluids in much higher rates and concentrations in these conditions. This debris problem requires routine remedial activity in the form of round trip "pigging" to scrape the I.D. of the Riser and clear solid deposits from its flow path.

Many subsea isolation valve installations such as those involving a semisubmersible rig use hydraulically operated plug or ball valves coupled to large hydraulic operators for quarter turn operation between open and closed positions. Because of the high operating pressures and the line sizes involved these valves are extremely heavy and have a fairly large profile exposed to wave and underwater current action. As a result such weight must be offset with buoyancy and the fixation system for the rig has to resist the wave and subsea current loading against the large profiles of these valves and their operators.

To address these issues the present invention proposes to use subsurface safety valves (SSV) of the type well known in the art in place of the heavy and high profile valves now being used as subsea isolation valves. To do this adaptations are made to enable a functionality akin to the traditional and proven operation of a subsurface safety valve yet in a marine environment, now in the horizontal orientation (in the preferred embodiment) and subject to bending loads (acting perpendicular to the longitudinal axis of the valve) resulting from wave action and subsea currents across the valve body. The borehole safety valves are adapted for the new environment with an outer housing and a sealing system that allows the borehole safety valve to be inserted in the housing and secured in a proper alignment with passages in the safety valve and surrounding housing sealingly aligned with oppositely oriented split sealing rings. The use of the outer housing and sealing system enables the effective implementation of traditional subsurface safety valve or subsurface barrier valve technologies in the marine environment, Apart from the above reference, the following references illustrate the state of the SSV art and position indication art: U.S. Pat. No. 8,176,975; US 20060157240; U.S. Pat. No. 7,533,693; U.S. Pat. No. 3,077,179; U.S. Pat. No. 5,890,450 and US 20120234410. Pressure compensation systems for downhole use are shown in U.S. Pat. No. 6,041,857 in the context of a rotationally operated downhole choke valve.

Apart from using an SSV as a subsea isolation valve, other novel features are the ability to put an external position indication to that valve and the manner in which such an external indication system operates. The hydraulic system operates the local indication feature. The hydraulic system normally has discrete lines leading to opposed ends of an operating piston for the SSV. Movement of the operating piston moves a flow tube against a flapper for the open position. A closure spring closes the valve by pushing up the flow tube when pressure is released in the operating control line. The force closed line goes to the back side of the operating piston and can be used to force the operating piston back up to close the valve when the closure spring fails to do so. Local hydraulic taps into those two control lines provide for local operation by a diver or an ROV. The local position indicator is preferably integrated into the force close line for the main reason that such line operates at significantly lower pressures than the pressures seen in the operating control line. The position indicator is a volumetric displacement device. The volume displaced by the operating piston is the volume pushed to the position indicator. Depending on the relative diameters of the operating piston compared to the indicating piston the movement of the indicating piston will be the same or different than the movement of the operating piston. In this manner the application of the known SSV design to a subsea application allows it to meet the requirements of API-6A/6DSS/17D standards. The indicator mechanism can be configured to be depth insensitive to seawater. The indicator can be calibrated as part of the manufacturing and assembly process in conjunction with its associated valve to compensate for any trapped compressible fluids in the system. The indicator piston can displace trapped fluid against a floating piston to isolate the indicating piston and its seals from seawater. The pressure compensation system for a flow tube and the sealing connections to an outer housing for high pressure subsea application and other features of the present invention will be more readily apparent to those skilled in the art from a review of the detailed description of the preferred embodiment and the associated drawings while recognizing that the full scope of the invention can be determined from the appended claims.

SUMMARY OF THE INVENTION

The annular space surrounding a flow tube in a subsurface safety valve is sealingly isolated at opposed ends of the flow tube and pressure compensated to the tubing pressure. The subsurface safety valve is inserted and aligned in an outer housing so that hydraulic operating connections are sealingly aligned with opposite hand split ring seals that are properly compressed when the safety valve is secured in its surrounding housing. The assembly is then able to meet the rigorous environmental loading conditions and debris latent process service conditions associated with subsea applications with minimal reconfiguration for what would otherwise serve as a borehole subsurface safety valve.

Other features such as local position indicating device for the safety valve are separately claimed in another application, the contents of which are repeated here for context. The position indicating device for a subsea isolation valve that has no other visual signals of its position, integrates to the hydraulic actuation system for the isolation valve. Three way valves, connected to an operating control line and a force closed balance line leading to opposed ends of an operating piston, are located by the isolation valve and redirected by a diver or ROV, to locally operate the valve. The balance line has a piston that is displaced with fluid pushed by the operating piston when the isolation valve is opened with hydraulic pressure in the operating control line local connection. The piston connected to the balance line moves an indicator out of its housing for the local indication that the isolation valve is open. Displaced fluid from movement of the piston in the position indicator moves a floating piston to keep seawater away from the indicating piston.

BRIEF DESCRIPTION OF THE DRAWINGS

FIG. 4 is an enlarged view of FIG. 3;

FIG. 5 is an enlarged view of the position indicator of FIG. 2;

FIG. 6 is a detailed view of the calibration system for the position indication rod;

FIG. 7 shows a position indicating rod exposed to seawater;

FIG. 10 shows the position indicator configured to be insensitive to seawater hydrostatic with the isolation valve in the closed position;

FIG. 11 is the view of FIG. 10 with the isolation valve in the open position;

FIG. 14 shows one of the compensating piston bores with the compensating piston against an upper travel stop;

FIG. 15 is a section view through a pressurizing bore into the sealed annular space around the flow tube;

DETAILED DESCRIPTION OF THE PREFERRED EMBODIMENT

Figure 1:
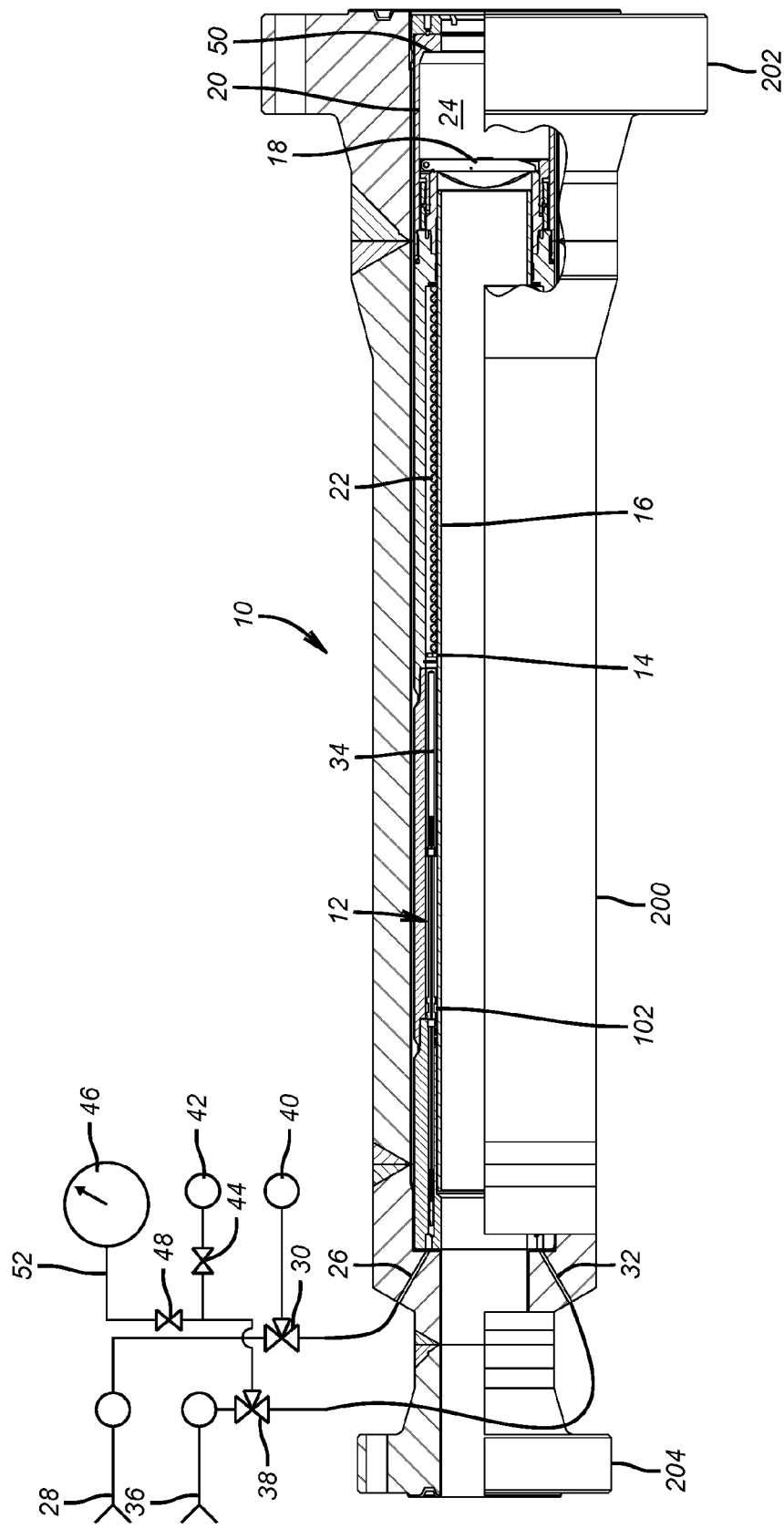
FIG. 1 is a part sectional view of the isolation valve schematically showing the hydraulic control system with position indicator.

FIG. 1 shows an isolation valve located subsea inside a housing 200 that has opposed flanged ends 202 and 204 associated with a riser leading to an adjacent platform that are not shown. The housing 200 allows the use of a borehole safety valve in a subsea application where threaded connections that are typically used on borehole safety valves is not permitted. The isolation valve 10 can be taken as used in a borehole and put in a housing 200 and flanged to a marine riser to present advantages of weight savings and a low profile to minimize the drag resulting from underwater currents which plagues the existing style of hydraulically actuated ball valves typically used in this service. Control lines 28 and 36 sealingly connect to connections 26 and 32 of the isolation valve 10 through the housing 200. Internally, the isolation valve 10 is a known design with an operating hydraulic piston assembly 12 connected to an upset 102 on a flow tube 16. Movement of the flow tube 16 against a flapper 18 rotates the flapper 18 into recess 20 as the flow tube 16 advances. Advancing of the flow tube 16 compresses the closure spring 22 while opening passage 24 as the flapper 18 is pushed behind the flow tube 16 for the open position of the isolation valve 10. Connection 26 is above the piston assembly 12 such that pressure applied from the offshore platform through line 28 when three way valve 30 is aligned for straight through flow will force the piston assembly 12 down for the open position of the isolation valve 10. Conversely removing pressure at the platform (not shown) at line 28 will allow the closure spring 22 to push up tab 14 on the flow tube 16 to let the flapper 18 rotate back to the closed position shown in FIG. 1. Typically, flapper 18 will have a pivot spring to urge the flapper 18 up to the FIG. 1 closed position as the flow tube 16 is pushed up by spring 22.

Connection 32 terminates at location 34 on the opposite side of the piston assembly 12 from connection 26. Hydraulic line 36 comes from the platform through three way valve 38 and onto connection 32 when the three way valve 38 is aligned for straight through flow. The three way valves 30 and 38 are locally mounted subsea near the isolation valve for operation by a diver or an ROV or they can be remotely operated from the platform through an umbilical line running past the three way valve locations if there is an operator associated with those valves. Pressure in line 36 can force the piston assembly 12 in the bias direction of spring 22 in the event that pressure removal in line 28 at the platform and the force of spring 22 fail to move the piston assembly 12 to the isolation valve 10 closed position shown in FIG. 1. The presence of line 36 is also used to oppose the hydrostatic pressure in line 28 so that the closure spring 22 is insensitive to control line hydrostatic pressure at the location of the isolation valve 10. The local indication system is properly operated by the three way valves 30 and 38 so that the position of the isolation valve 10 can be visually determined locally to meet API standards mentioned above.

During platform operation, operating control line 28 is aligned through valve 30 to connection 26 while forced close control line 36 is aligned through valve 38 to connection 32. In normal operation, pressure is applied to operating control line 28 to open isolation valve 10 and the pressure is removed from operating control line 28 to allow spring 22 to close the isolation valve 10.

To enable local operation with a diver or ROV, the pressure in line 28 is removed to put the isolation valve 10 in the closed position. The fact that isolation valve 10 is closed can be confirmed on the platform. It is important to take these steps first to prevent liquid lock in the control system as will be explained below. With the isolation valve 10 in the closed position of FIG. 1 and a diver or ROV having connected to connections 40 and 42, the position of the three way valves can be changed to isolate the platform and enable operation of the isolation valve 10 locally by the diver or ROV through connections 40 and 42. Connection 40 becomes the origin of the operating control line that leads through three way valve 30 to connection 26. This alignment is automatic on operation of the three way valve 30. Connection 42, after valve 44 is opened and three way valve 38 is operated, now becomes the force closed control line to connection 32. Valve 44 can optionally isolate connection 42 or enable it for force closed operation of the isolation valve 10. When valve 44 is closed, the hydraulic fluid displaced by movement of the piston assembly 12 is directed to the position indication system 46. The position indication system 46 is shown schematically in FIG. 1 to illustrate its placement in the hydraulic system behind shutoff valve 48 that is operated after isolation valve 10 is in the closed position followed by operation of the three way valves 30 and 38 with the connections 40 and 42 connected to a hydraulic pressure source by a diver or an ROV. Valve 48 allows the position indication system 46 to be removed for maintenance while the isolation valve 10 is normally operated from the platform.

Before discussing the details of the position indication system 46, those skilled in the art will appreciate that movement of piston assembly 12 against spring 22 will displace a given volume of hydraulic fluid ahead of the piston assembly 12 and the amount depends on the piston area multiplied by the distance the operating piston assembly 12 moves to get the flow tube 16 to a travel stop 50. That volume of hydraulic fluid displaced by the piston assembly 12, with valve 48 open and valve 44 closed or with connection 42 otherwise prevented from taking displaced fluid from the movement of the piston assembly 12, will now go into the position indication system 46 at its inlet 52.

Figures 2, 3:
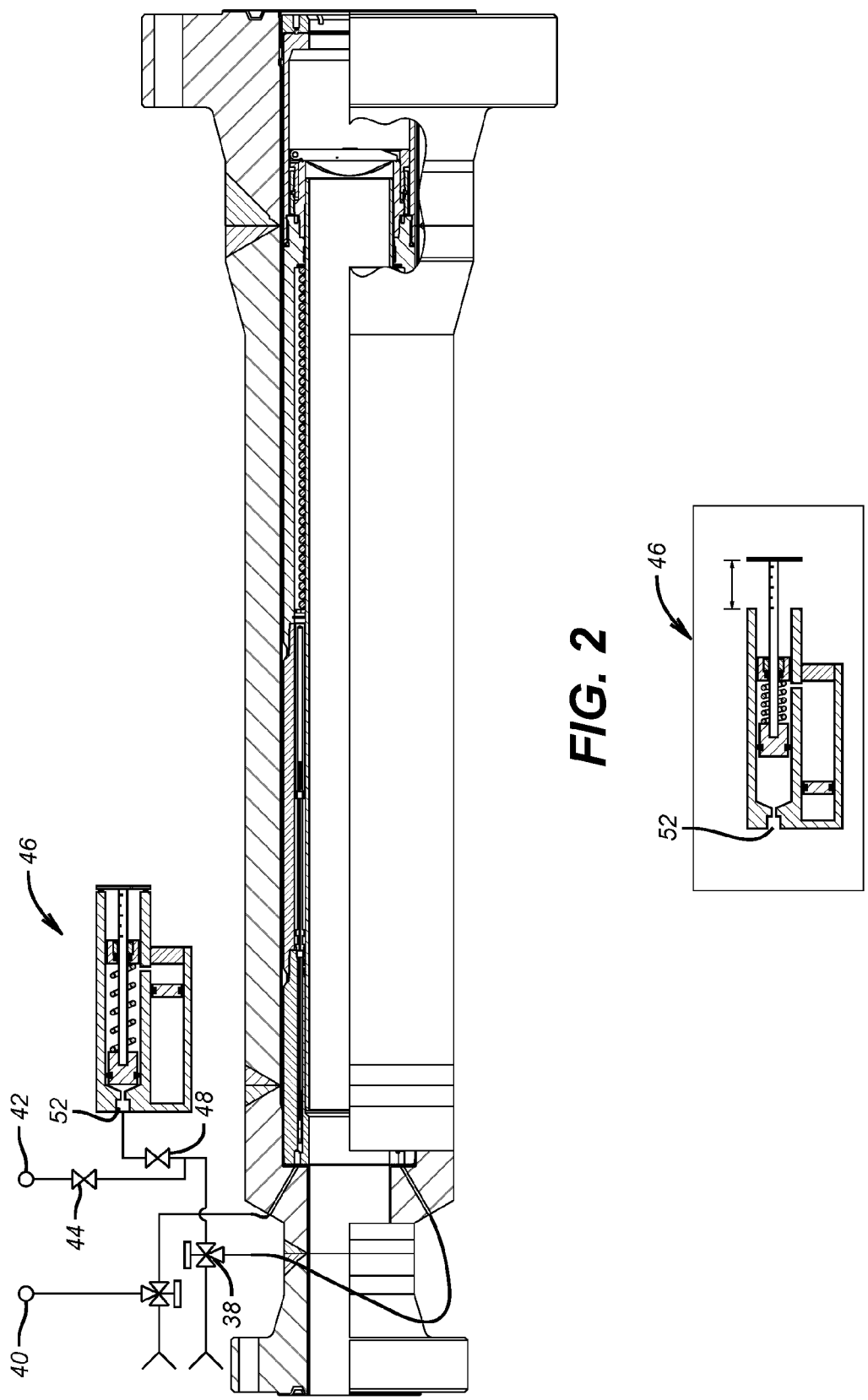
FIG. 2 is the view of FIG. 1 with a detailed view of the position indicator in the isolation valve closed position.
FIG. 3 is the view of the position indicator in the isolation valve open position.

FIG. 2 shows the position indication system 46 in the isolation valve 10 closed position while FIG. 3 shows the system 46 in the isolation valve 10 open position. The system 46 is shown enlarged in FIGS. 4 and 5 and is first introduced in FIGS. 2 and 3 to show its juxtaposition to the isolation valve 10 and the associated hydraulic circuits described above.

FIG. 5 will be used to describe the position indication system for the closed position of the isolation valve 10. Hydraulic fluid displaced by piston assembly 12 enters inlet 52 of housing 54 to apply pressure against indicating piston 56 that has a seal 58. Spring 60 pushes piston 56 toward inlet 52. Spring 60 is supported at support 62. Movement of indicating piston 56 displaces hydraulic fluid in a sealed variable volume chamber 64 that is in part defined by a floating piston 66 that has a seal 68. On the opposite side of the floating piston 66 is a low pressure variable volume chamber 70 that can be at atmospheric or some other low pressure and can be air or an inert compressible fluid such as nitrogen.

Indicating piston 56 is connected to indicating rod 72 that has graduations 74 and an end plate 76. FIG. 6 shows a way to axially adjust the rod 72 with respect to its extension from piston 56 and will be described in more detail below. Rod 72 is sealed at seal 78 to isolate the hydraulic fluid in chamber 64 from seawater. A wiper 80 is next to seal 78 to keep solids in the seawater away from seal 78. In the closed position the plate 76 can be in contact or near open end 82 of housing 54. Optionally, a seal 84 can be on end 82 if for nothing else than to be a shock absorber for the plate 76 when the bias of spring 60 moves piston 56 toward inlet 52 indicating the isolation valve closed position of FIG. 5. It may also be advantageous to have one or more ports open in plate 86 to minimize the prospect of sticking the plate 76 to the housing 54.

Referring to FIG. 4 as the pressure is raised at subsea connection 40 or through platform supply 28, the piston assembly 12 of the isolation valve 10 pushes fluid toward inlet 52 to overcome the force of spring 60 and displace fluid in chamber 64 against the floating piston 66 reducing the volume of chamber 70. Movement of indicating piston 56 extends graduations 74 out of housing opening 82 to give the reading of percent open indicated by arrow 88. It should be noted that if the actuating piston assembly 12 is the same diameter as piston 56 they will each move the identical distance as a predetermined volume of hydraulic fluid is displaced. If piston 56 has a smaller diameter than piston assembly 12 then piston 56 will move further than piston assembly 12 and vice versa. Spring 60 overcomes friction in seal 58 to force piston 56 toward inlet 52 as the isolation valve 10 is allowed to move to the closed position. In FIGS. 4 and 5 the design of piston 56 is close to being insensitive to seawater hydrostatic pressure with the net force on piston 56 toward inlet 52 from seawater hydrostatic equal to the force acting on the cross-sectional area of the rod 72 connected to the piston 56.

While the rod 72 can be threaded to piston 56 to bottom into a blind bore as shown in FIGS. 4 and 5, an adjustment mechanism shown in FIG. 6 can be used featuring a turnbuckle 90 threaded at 92 to the piston 56 with the other end 96 receiving threads 94 of rod 72 and a lock nut 98 holding the position of rod 72 with respect to the turnbuckle 90. The reason for this adjusting and locking system is that when the isolation valve's hydraulic circuit for balance/force close feature is charged with incompressible hydraulic fluid there may be a pocket of compressible gas. This means that some pressure from the piston assembly 12 tending to move fluid out of the isolation valve's hydraulic circuit for balance/force close will instead simply compress some of the remaining compressible fluid in that chamber rather than displacing the fluid into the position indicating system 46 to give an inaccurate reading of the percent open for the isolation valve 10. In the shop after the isolation valve is hooked up and while the flapper 18 position can be verified visually through the flanged end 202, the adjustment described in FIG. 6 can be used to insure the plate 76 is in when the isolation valve 10 is closed and reading 100% open when the isolation valve is wide open, the two extreme positions shown in FIGS. 4 and 5.

FIG. 7 shows an even simpler configuration of the position indicating system 46. Here the system is sensitive to the hydrostatic pressure of the seawater because only the wiper 80 is used without seal 78 shown in FIGS. 4 and 5. As a result seawater gets into the chamber 96 where spring 60 is located. The floating piston 66 and chamber 70 become unnecessary. In this version additional pressure needs to be applied at connection 26 to open the isolation valve 10 but the load on the closure spring 22 is reduced by a like amount as the seawater hydrostatic works in the same direction to try to close the isolation valve 10. In this version the spring 60 is optional as the seawater hydrostatic should normally be sufficient to overcome friction of seal 58 when pressure is reduced at connection 26 to allow the isolation valve 10 to close.

Figure 8:
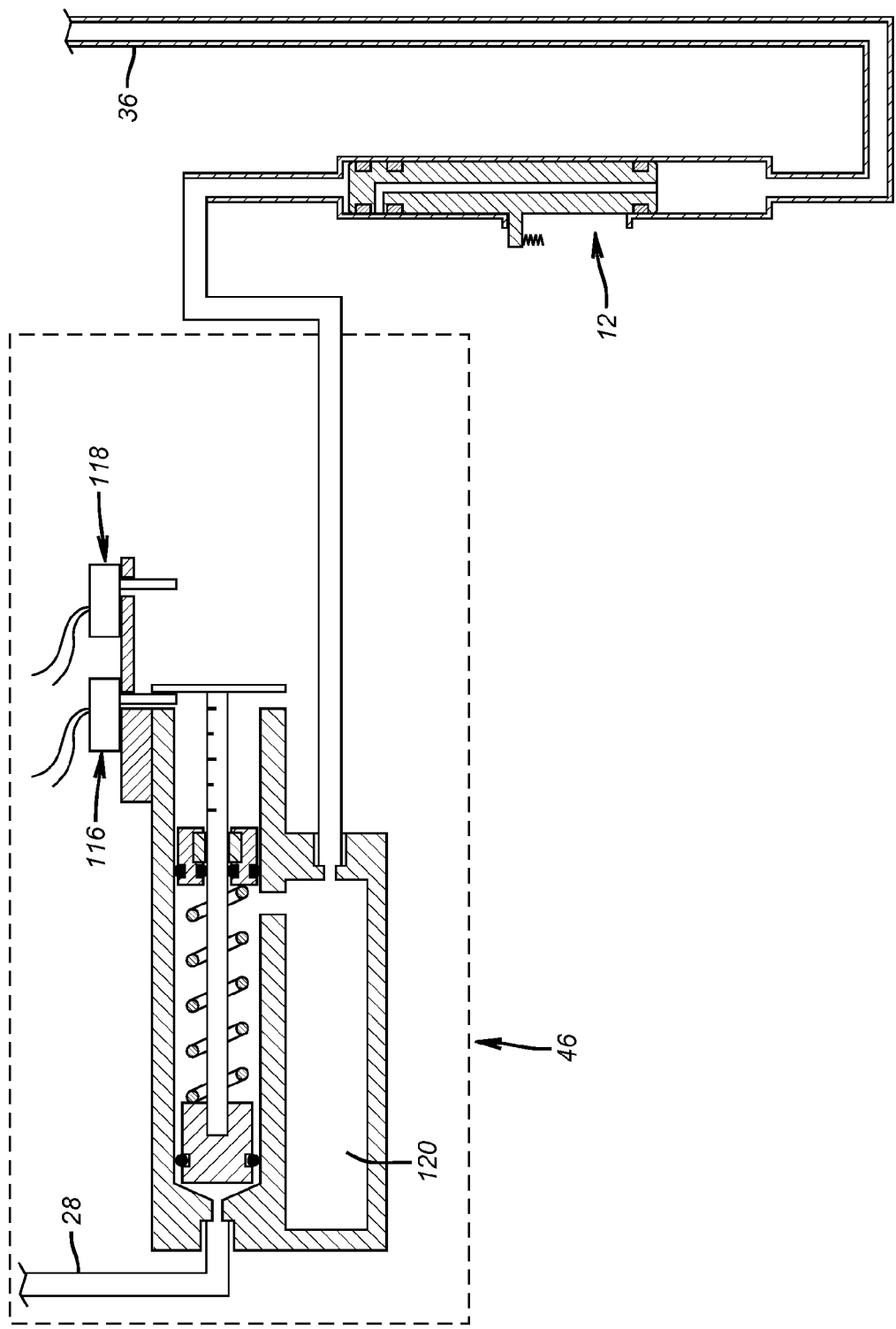
FIG. 8 shows a position indicator connected to an operating control line in the isolation valve closed position.
Figure 9:
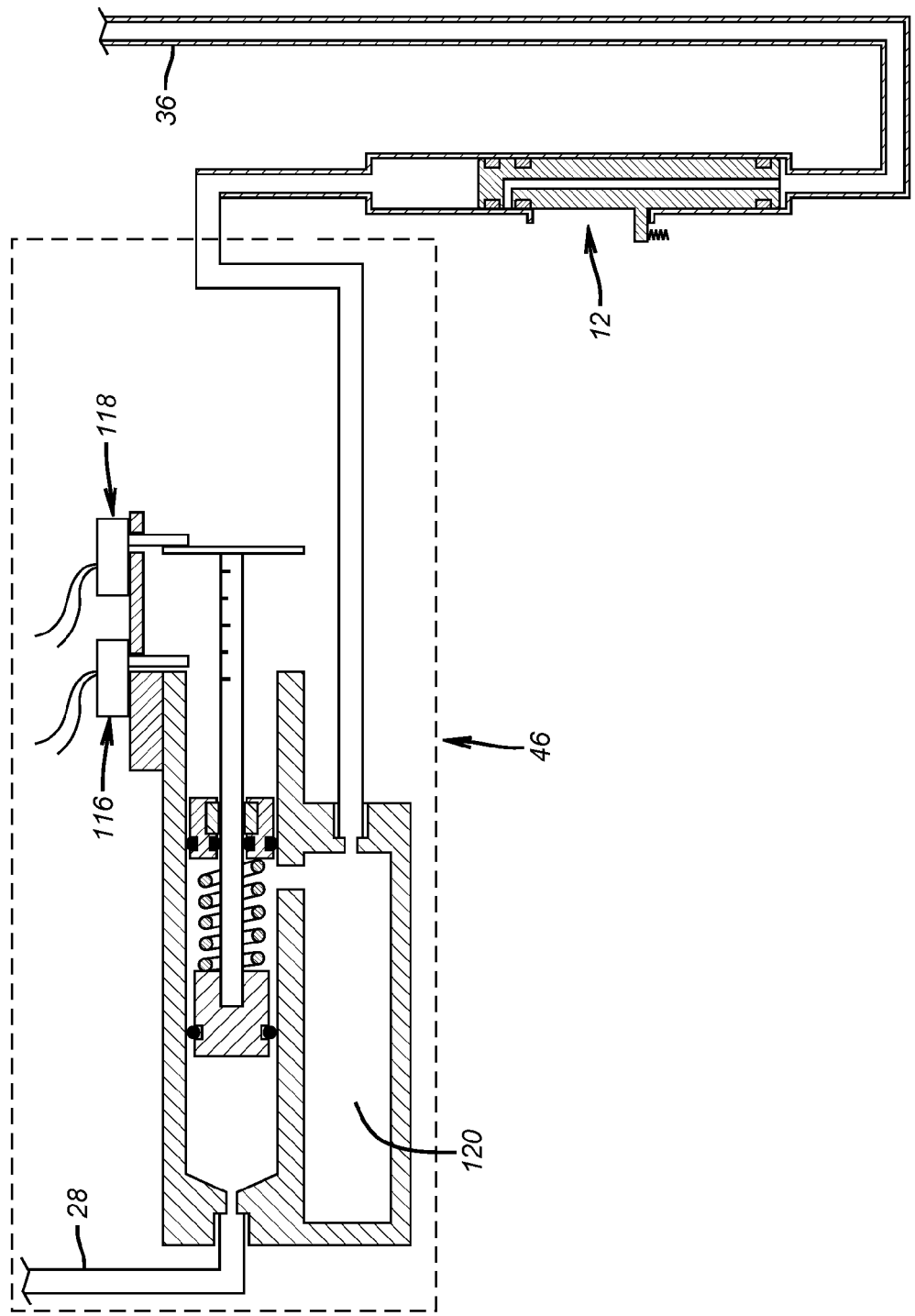
FIG. 9 is the view of FIG. 8 in the isolation valve open position.

FIGS. 8 and 9 show an alternative placement of the position indication system 46 on the operating control line 28 leading to connection 26. Here the operating piston assembly 12 is shown schematically in the valve closed position in FIG. 8 and the isolation valve 10 open position in FIG. 9. In this positioning the piston 56 has to displace a volume needed to move the piston assembly 12 so that the flow tube 16 hits the travel stop 50. If the pistons are the same diameter they will both move equal amounts as pressure builds in line 28. At the same time the rod 72 extends as previously described to give the percent open indication. The big difference here is that the position indicating system 46 is continuously active (in lieu of intermittently active during ROV or diver witness as discussed in the previous embodiment), indicating the position of the valve at all times. In addition, the line 28 sees the higher pressure needed to compress spring 22 so that the seals and the components of the position indication system 46 will need to be rated at a much higher pressure on the order of 10,000 PSI. This placement makes the system 46 more expensive and less preferred for local indication to a diver or ROV. However, its usefulness is appreciated in that if electronic contact switches 116 and 118 are configured to the system 46 as shown in FIG. 8 and FIG. 9 the continuously active position indicating system could be used to relay an open/close electric signal to the platform for round-the-clock monitoring.

FIGS. 8 and 9 show the position indicating system 46 plumbed into the control line 28, in lieu of the balance line 36, which is an alternate embodiment. In this configuration, the position indicating system would function continuously (always indicating the subsea isolation valve's position). In this embodiment, as fluid from control line 28 is pushed into the system 46 an equivalent volume of fluid is displaced from reservoir 120 into the subsea isolation valve connection 26 to open the valve. Throughout which time, spring 60 and closure spring 22 are operatively compressed in conjunction with the movement of fluid. Although continuous position indication could be beneficial if the end user wanted an indicator that showed valve position at all times (even in the absence of a diver or ROV), the preferred embodiment for local indication only would likely be one that is used intermittently (as needed). With the continuous indication embodiment (FIG. 8 and FIG. 9) the system 46 must be designed for much higher operating pressures. Further, if the fixed fluid volume between the system 46 and the isolation valve were to leak, the end user could experience a situation where the valve would be unable to fully open due to the lack of fluid. The indicator would also need to be designed for a higher number of cycles (if it were to function continuously). Consequently, the simpler solution is to have a position indicator that is tied into the balance line 36.

Since FIGS. 8 and 9 present a solution for continuously active indication, electric limit switches (contact switches) 116 and 118 or other ways to transmit the position of plate 76 could be added allowing the indicator to send a signal to the platform for electronic monitoring or monitoring using other technologies.

FIGS. 10 and 11 unlike FIGS. 4 and 5 make the system 46 totally independent of seawater hydrostatic pressure. Here rods 112 and 122 on both sides of plate 76 are the same outer diameter and sealingly extend into piston retainers 100 on both sides with static rod seals 110. Given that rods 112 and 122 are equal in outer diameter the seawater hydrostatic does not bias the system 46 in either direction. The system 46 has variable volume cavities 104 and 114 that are at atmospheric or another low pressure that offers no substantial force against piston 56 and rod 122 in the direction of inlet 52. Chamber 104 is sealed by end cap 106. Indicating graduations 124 appear on the indicator's outer housing 126 so that in a part open position the percentage open can be read with respect to the position of the plate 76. Since these graduations are on the exterior of the system 46 and easily accessible, they can be applied after the system is attached to the associated subsea isolation valve and tested for proper calibration (in the shop). The normal operating position for the subsea isolation valve is closed or wide open.

What is described above provides for the use of a lighter valve with a low profile in a subsea application whose use is viable because a local position indication system is fitted to the valve externally through its control line operating system. Although a two line system is described the position indication system can be operable in a one line system with adjustment to the size of the closure spring. Using the hydraulic fluid displaced by the operating piston gives a direct readout of valve position as the operating piston fluid displacement winds up being the fluid displaced by the position indicating piston or the other way around. The position indicating piston can be independent of seawater hydrostatic in a configuration where the indicating piston is isolated from seawater. Alternatively the indicating system can be simplified by allowing seawater hydrostatic to get to the indicating piston in which case seawater hydrostatic acts on the piston meaning that a higher pressure is needed in the operating control line while the closure spring force can be reduced. The indicating system can be placed in the operating control line but its components will see higher operating pressures than a location in a force closed control line. The indicating rod can be position adjusted relative to the indicating piston with an adjustment assembly as in FIG. 6 to compensate for any remaining compressible fluid that may be trapped in isolation valve's hydraulic circuit for balance/force closure.

Figure 12:
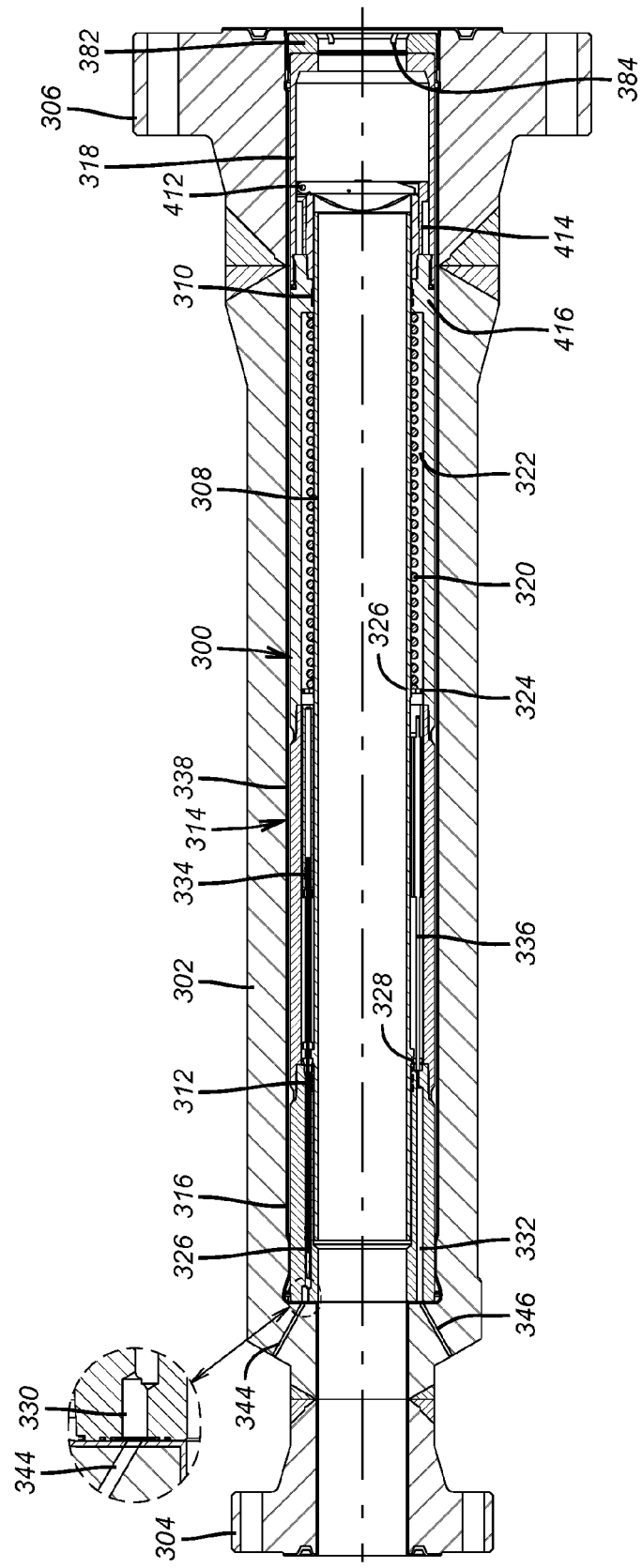
FIG. 12 is a section view of the subsurface safety valve inside a housing illustrating the flow tube seals and the connection seals for the hydraulic lines between the two.
Figure 13:
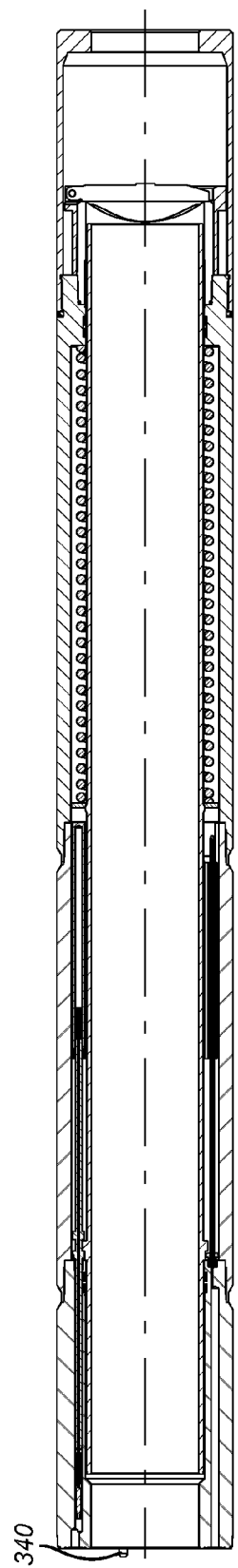
FIG. 13 is the view of FIG. 12 with the flanged outer housing removed and showing the seals to the flow tube enlarged.
Figure 16:
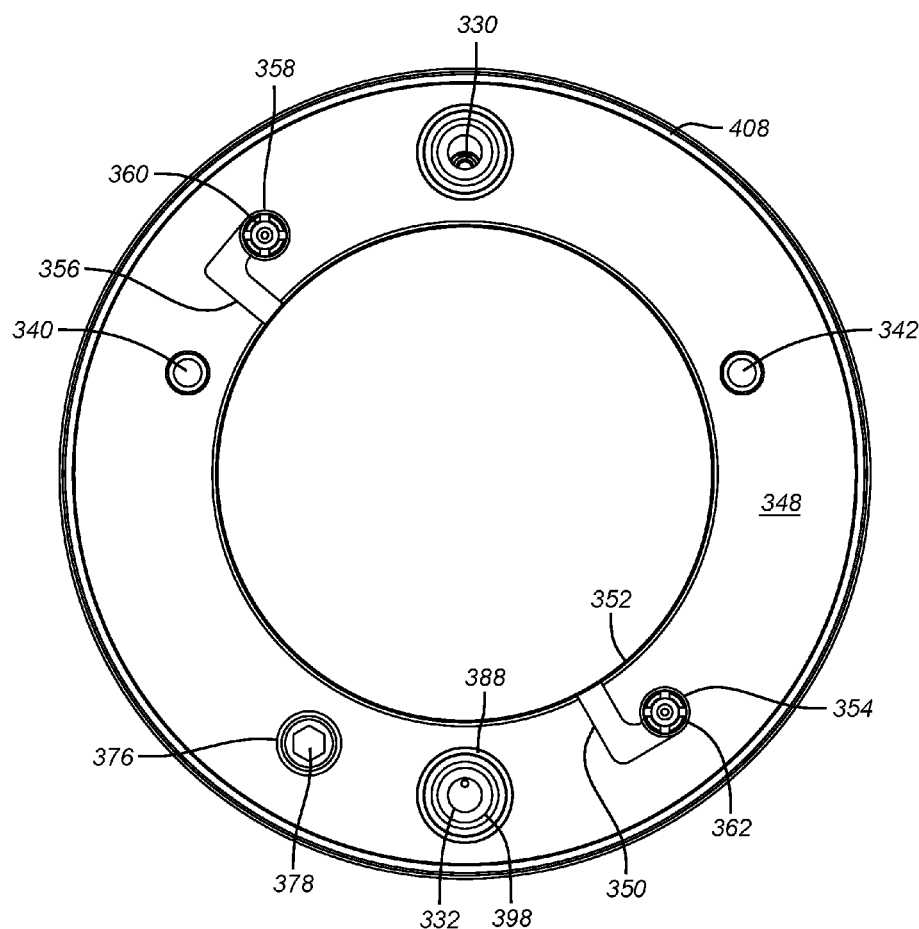
FIG. 16 is an end view of the housing of the safety valve showing the relative positions of the various axial bores through the wall.

Referring to FIG. 12 a borehole safety valve 300 is fitted in a housing 302 with flanged end connections 304 and 306 for optional connection to a marine riser that is not shown when a subsea application is envisioned. In an onshore well that has high operating pressure the housing 302 can be eliminated. In the configuration for subsea service, the outer housing 302 (flanged or otherwise connected to the marine riser) is designed to carry all external loads (tensile, compressive, and bending) without transferring said loads or imparting an orthogonal deflection to the borehole safety valve 300. External piping loads, tensile or compressive, and especially bending loads from subsea currents and wave action in a direction perpendicular to the centerline of the valve can burden the safety valve design greatly. In particular, traditional borehole safety valve design considerations do not account for applied bending loads given the nature of the environment in which the valve is installed (i.e. in a near vertical subsurface tubing string typically in tension or compression). Therefore common design practices for these valves, such as the use of tight tolerance annular gaps between components (on the order of 0.005" or less) for sand prevention and other critical functionality, can lead to excessive wear or even binding between parts when components are flexed in a direction perpendicular to their centerline. Therefore, direct implementation of traditional borehole safety valve designs in a subsea environment (without an outer housing) is challenged greatly. Returning to FIG. 12 the flow tube 308 is sealed near opposed ends at seals 310 and 312 to a multicomponent outer body 314 that extends from cylinder sub 316 to flapper housing 318. Closure spring 320 resides in an annular cavity 322 where it bears on ring 324 which is in turn supported by tab 326 on the outside of the flow tube 308. An operating piston 326 is secured to flow tube 308 at lug 328. Hydraulic pressure at connection 330 moves the piston 326 with flow tube 308 against the closure spring 320. Connection 332 is the force closed connection and it is communicated to the underside of the piston 326 below seal 334 through a jumper line that is not shown in FIG. 1 because of where the section view is taken. Pressure applied at connection 332 goes through passage 336 to come under seal 334 to push the piston 326 and with it the flow tube 308 aided by the force from the closure spring 320. Referring to FIG. 16 which is an end view of the body 314 several items and their relative positions through cylinder sub 316 and body component 338 can be seen. First there are alignment pins 340 and 342 only one of which is visible in the section view of FIG. 13. Theses pins only fit one way into mating receptacles in housing 302 so that passage 344 aligns with connection 330 and passage 346 aligns with connection 332. Those skilled in the art will appreciate that hydraulic control lines from a remote location are connected to passages 344 and 346 to result in movement of the flow tube 308 as described above. The above description applies when forcibly closing the valve while normal closing is accomplished with the closure spring.

It is desirable to shield the annular space 322 from debris that is in the connected tubing and that is the reason for the installation of seals 310 and 312. However, using these seals can set up a condition of differential pressure across the flow tube 308 that is so high so as to burst the flow tube outwardly into a lower pressure that may be in the space 322 or collapse the flow tube inwardly if the pressure in space 322 exceeds the tubing pressure. This can happen in a high pressure application where the pressure can vary with the valve location. Thus to retain the benefit of sealing around the flow tube and isolating space 322 a compensation system will now be described that prevents large pressure differentials from building up on opposed sides of the flow tube 308. Referring again to FIG. 16 the end wall 348 has a groove 350 shown with an l-shape but other configurations are envisioned. The groove 350 has an end at the inner wall 352 of the cylinder sub 316. The other groove end is at a bore 354. Optionally, a second groove 356 also optionally configured as an l-shape extends from inner wall 352 to bore 358. Bores 354 and 358 lead to annular space 322. Travel stops 360 and 362 are respectively threaded into bores 358 and 354. A section through bore 358 is shown in FIG. 14 with stop 360. A compensating piston sees tubing pressure through passage 364 in stop 360. The piston 368 has a peripheral seal 366 against passage 354. A rupture disc or other breakable member 370 obstructs passage 372 through the piston 368. Stop 374 defines the other end of the range of movement of piston 368. If the piston 368 gets stuck such as with excessive seal friction or runs out of travel within the bore 358 the rupture disc 370 can break to open passage 372 to still provide some pressure compensation capability. In an alternate embodiment, not shown in the figures, the pressure relief functionality provided by rupture disc 370 can be performed by incorporating one-way pressure relief valves such as Lee High Pressure Precision Relief Valve Inserts (PRI) or equivalent. In such embodiment, it is envisioned that two pressure relief valves are required given their one-way functionality. Thus two pressure relief valves would be installed in two new through bores in the cylinder sub 316 (one pressure relief valve per bore) and facing opposite directions to relieve pressure build up either into or out of the annular cavity 322. Returning to the preferred embodiment, the details for bore 354 are the same as above described for bore 358 and will not be repeated. While two such compensation bores are shown one or more can be used depending on design conditions.

Referring to FIGS. 15 and 16 a bore 376 is plugged by plug 378. A check valve 380 allows flow into bore 376 but not out of this bore. Bore 376 as with bores 354 and 358 terminate in annular space 322 where the closure spring 320 is mounted. The goal is to fill the space 322 and the bores 354 and 358 and bore 376 as much as possible with an incompressible fluid and compress to as small a volume as possible any remaining compressible fluid such as air so that the compensating pistons(s) can have the benefit of hydraulic fluid displacement rather than compressing a compressible fluid so that the compensation feature can be fully effective between the stops 360 and 374. A pressure of as little as several hundred pounds per square inch in annular space 322 will reduce the volume of any compressible bubble in the compensation system to insignificance as the gas pocket volume, if any, will be reduced in volume by over 90%. Charging the system through bore 376 places the compensating piston or pistons 368 against the respective uphole stops such as 360 and 362. As pressure builds in the tubing the compensating piston moves toward downhole stop 374 to compensate for the tubing pressure buildup by increasing the pressure a like amount in annular space 322. Conversely, a pressure buildup in annular space 322 will move the compensating piston(s) toward stops 360 and 362 and equalize the pressure across the flow tube 308 wall so that collapse or bursting is avoided. The state of pressure balance between the annular space 322 and the internal flow path of flow tube 308 dissuades leakage into or out of the isolated region of the valve which is optimal. Also, said condition places seals 310 and 312 in an ideal unloaded state. In the unloaded state, seals 310 and 312 are minimally energized against flow tube 308 and the juxtaposed housings of outer body 314 by virtue of only a diametrical squeeze or perhaps the mechanical energy of a spring energized seal (depending on the selected seal design). As a result, the pressure balanced friction associated with seals 310 and 312, resisting the free movement of flow tube 308, is far less than that which would be experienced in a pressure energized condition. Recognizing the size of seals 310 and 312, pressure energized friction can significantly resist flow tube movement, and thus require a very high hydraulic pressure to actuate the valve open and closed (applied at control line connection 330), on the order of greater than 15,000 psi. Hydraulic supply pressures of this magnitude require operators to install specialized and often times very costly high pressure equipment (pumps, valves, umbilicals, etc.) just to make use of the isolation valve. Consequently, a method to reduce seal friction within the valve (as mentioned above) is well received by operators from an overall installations and project cost standpoint. Finally, one skilled in the art will also appreciate the increased reliability and longevity of seals 310 and 312 when flow tube 308 is stroked with the seals in a pressure balanced, minimally energized, condition. To that end, seal wear will be greatly reduced when compared to the same operation in a highly energized state.

Figure 17:
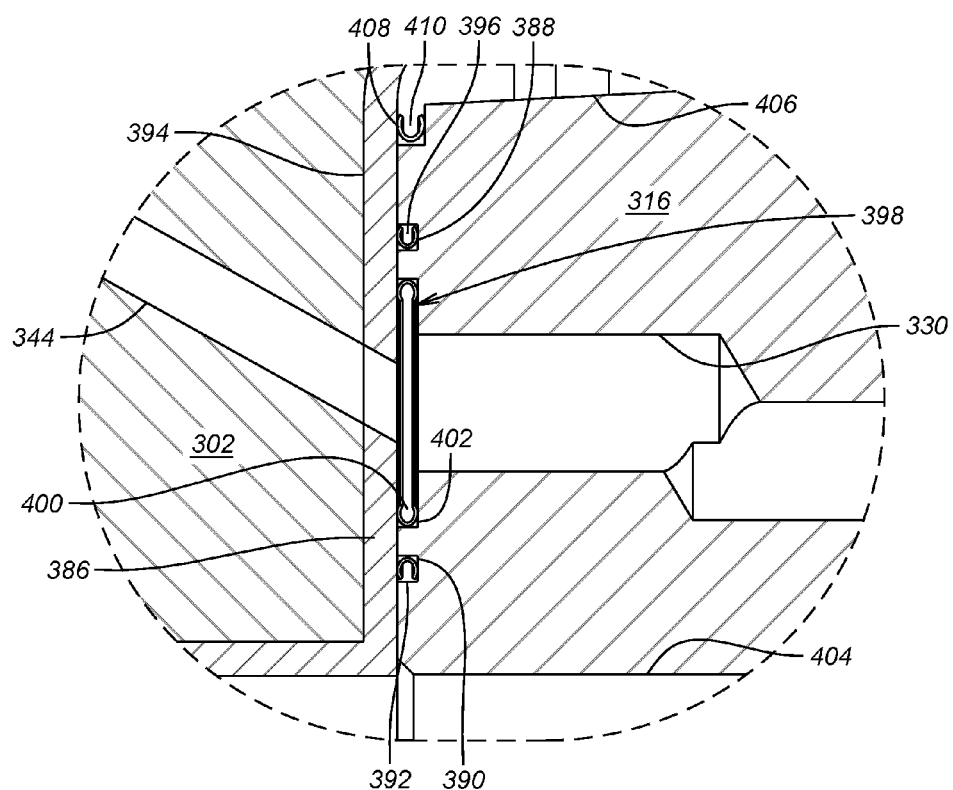
FIG. 17 is an enlarged view of a sealing arrangement between the safety valve body and the surrounding housing.
Figure 18:
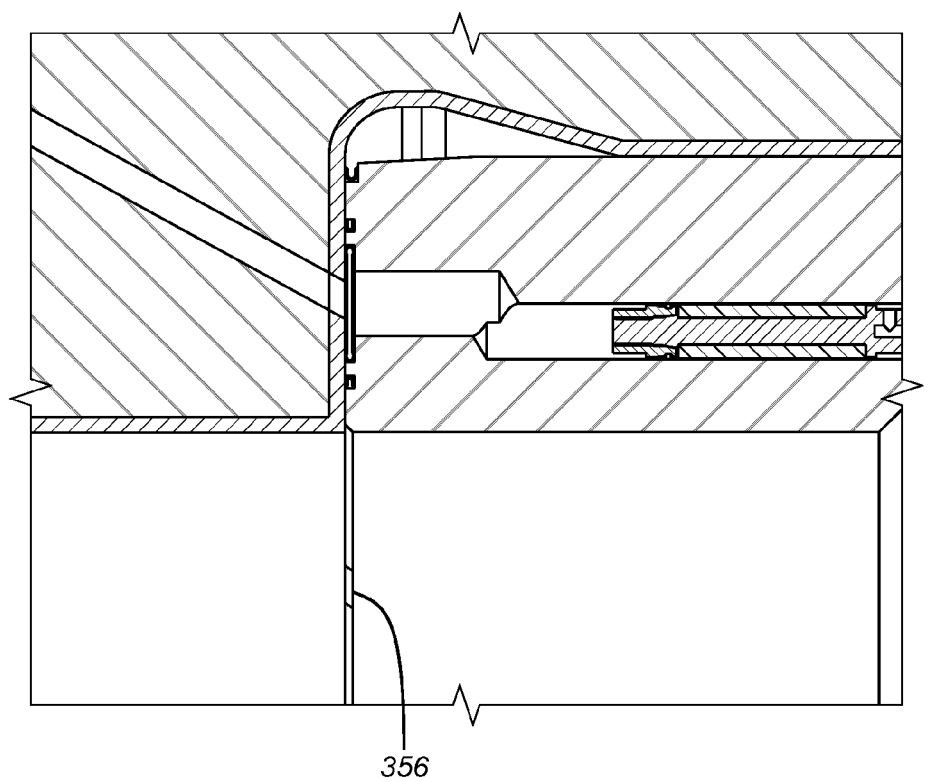
FIG. 18 is a section view through the end of the safety valve body showing the communication path to tubing pressure for the pressure compensation system.

Referring now to FIGS. 12 and 17 a part section is shown of the cylinder sub 316 that has connection 330 which ends up aligned with passage 344 of housing 302 when the alignment pins 340 and 342 enter their respective bores (not shown) in housing 302. This alignment between housing 302 and valve 300 allows for the rotational orientation of the flapper 18 to be set in an optimal position without affecting the alignment of the connections 330 and 332 and their respective passages 344 and 346. After installation of valve 300 into housing 302 the joined assembly can be rotated to clock the flapper 18 relative to grade. Confirmation of flapper orientation can be verified by looking through flange 202. Afterwards, a paint mark or otherwise identifying feature can be applied to the exterior of housing 302 to define the optimal orientation. Ideally, the flapper hinge 412 is located at top dead center, yet its installed orientation (relative to connections 330 and 332) is undeterminable since the flapper seat 414 (which defines the flapper orientation) is threaded into its mating spring housing 416. With flapper hinge 412 at top dead center, the self-weight of flapper 18 acting vertically downward assists movement of the flapper towards the closed position. In this configuration, the torsion springs (not shown), which are commonly used in borehole safety valve designs to bias flappers to their closed position, do not have to overcome the weight of flapper, as shown in U.S. Pat. No. 6,328,062 B1. Thus a more reliable flapper closure mechanism configuration is established given the flapper will be inherently biased towards the closed position even in the event of a torsion spring failure. The position of the safety valve 300 is secured in housing 302 using inner driver or nut 382 that is mounted with a tool engaging spaced slots 384. Tightening nut 382 pushes cylinder sub 316 against a liner sleeve 386 which compresses axially a circumferentially split ring seal 388 to span between bottom surface 390 of groove 392 and surface 394 of sleeve 386. The open split 396 faces away from the longitudinal axis of ring seal 388 to stop pressure heading in the reverse direction (towards connection 330). Within ring seal 388 is a similar and smaller ring seal 398 with a split 400 facing its longitudinal axis (towards connection 330). Ring seal 398 is compressed between lower groove surface 402 and surface 394. Ring seal 398 keeps pressure from connection 330 from escaping radially outwards (in the direction toward inner surface 404 and outer surface 406 of cylinder sub 316). A similarly split outer ring seal 408 has an opening 410 looking toward the surrounding housing 302. While FIG. 17 shows the connection at passage 344 for the opening control line the detail is the same at passage 346 for the force close control line connection. This is made clearer in FIG. 16. Ring seal 408 keeps pressure from the exterior of the safety valve 300 from passing to its interior (towards the valve I.D.) when the valve's flapper 18 is in the closed position and a differential pressure exists across the flapper 18 (in the direction from flange 202 towards flange 204). In the valve open condition (not shown in the figures) pressure is equalized across the valve's outer surface 406 and inner surface 404, placing ring seal 408 in a state of pressure balance. Thus, ring seal 408 serves as an annular boundary against fluid movement when the safety valve is closed. Other embodiments of the annular pressure boundary for the valve could include an annular packing assembly energized against outer surface 406 and the interior of housing 302; however such configurations are substantially burdened by various design challenges including improper centralization between parts resulting uneven extrusion gaps at the top and bottom of the annular packing assembly and shuttling of the annular packing assembly during pressure reversals in a debris latent environment. While circumferentially split ring seals that have the splits oppositely oriented are preferred to establish the pressure boundary for the hydraulic connections other types of seals are also contemplated if they can handle high differential pressures as much as 22,500 PSI and the anticipated service temperature extremes for subsea use which can go as high as 400 degrees F. and as low as 20 degrees F.

Sleeve 386 represents an optional thin layer of weld overlay (i.e. cladding) of Nickel Alloy. Said weld overlay is only intended to serve the purpose of providing a corrosion resistant layer to the base metallurgy of housing 302 (typically carbon steel) so it can withstand contact with corrosive elements contained in the production fluids. It is not necessary to have weld overlay in all instances throughout the entirety of housing 302 depending on the corrosiveness of the service environment. However, when housing 302 is made of carbon steel it is likely best practice to always have at least the load shoulder (where the circumferentially split ring seals 388, 398, and 408 engage) overlaid because corrosion or rust can jeopardize the C-shaped seal integrity.

The ability to take a borehole safety valve and put it into a surrounding housing with the control line connections aligned and sealed to the housing as the safety valve is secured to the housing with a jam nut suddenly and without other conversions repurposes the borehole safety valve for subsea service. The alignment pins insure only a proper alignment will allow threading on the jam nut and enable the surrounding housing to be rotated to satisfy an ideal flapper orientation (post assembly) without impacting alignment of the hydraulic connections. The ring seals hold pressure in opposed directions while taking up less space due to the concentric layout. Finally, the flanged outer housing carries all external piping and environmental loads germane to the subsea application without transferring said loads or deflections to the inner safety valve.

Independently, the flow tube sealing feature with the chargeable pressure compensation system allows any flow tube flapper safety valve (or comparably functioning barrier valves) to be used anywhere in high pressure and heavy debris applications without concern of buckling or bursting the flow tube or excessively high hydraulic opening pressures. The wall thickness of the flow tube can be reduced because the compensation system prevents undue differential pressure across the flow tube wall while keeping out debris from the tubing from getting behind the flow tube. A thinner flow tube wall allows greater flow with less resistance than a smaller drift dimension that would be needed with a thicker flow tube wall. As well, the equalized pressure across the flow tube minimizes operating system friction of the flow tube and thereby reduces the hydraulic opening pressure of the safety valve. Pressurizing the compensation system allows minimization of risk to the movement of the compensating pistons from the presence of compressible fluid pockets. The compensation system can be deployed in any safety valve (or barrier valve) regardless of the application. The use of the housing that aligns the connections to activate the sealing system independently allows reconfiguration of a borehole safety valve to subsea use without internal modifications. The compensation system can also be used by itself in a borehole for an onshore well or an offshore subsea application for the safety valve.

The above description is illustrative of the preferred embodiment and many modifications may be made by those skilled in the art without departing from the invention whose scope is to be determined from the literal and equivalent scope of the claims below:

We claim:

1. A safety valve assembly for use in a tubular string, comprising:
   a body having a hydraulically operated flow tube to selectively move into and out of contact with a flapper to selectively open and close a passage through said body and said flow tube wherein movement of said flapper selectively opens and closes said passage;
   said flow tube sealed to said body defining an isolated annular space in between when said flapper is in an open and a closed position;
   a pressure compensation system operable between the passage and said isolated annular space to control differential pressure between said passage in said flow tube and said isolated annular space, said pressure compensation system comprising a movably mounted piston between opposed stops with a pressure relief device that selectively opens if pressure differential across said piston exceeds a predetermined amount.

2. The valve assembly of claim 1, wherein:
said annular space is substantially filled with at least one incompressible fluid.

3. The valve assembly of claim 2, wherein:
said incompressible fluid is initially pressurized.

4. The valve assembly of claim 2, wherein:
said pressure compensation system comprises at least one floating piston containing said incompressible fluid on one side and pressure in said passage of said flow tube on an opposite side.

5. The valve assembly of claim 4, wherein:
said floating piston comprises a flowpath therethrough initially blocked by a breakable member.

6. The valve assembly of claim 5, wherein:
said breakable member is pressure responsive to break at a predetermined differential pressure.

7. The valve assembly of claim 4, wherein:
said floating piston is slidable between opposed travel stops in a respective axial bore in said body.

8. The valve assembly of claim 3, wherein:
said incompressible fluid is delivered through a pressurizing bore extending axially through said body and further comprising a check valve to retain said incompressible fluid in said annular space.

9. The valve assembly of claim 1, further comprising:
an outer housing comprising a passage therethrough into which said body is inserted, said outer housing comprising end connections for attachment to a tubular string, said body sealingly secured to said housing by virtue of being inserted and secured in said passage of said outer housing so that at least one connection on said body for operation of said flow tube is sealingly extended to an outer surface of said housing.

10. The valve assembly of claim 9, wherein:
said outer housing protects said body from tensile, compressive and bending loads associated with subsea service.

11. The valve assembly of claim 9, wherein:
said body comprising at least one alignment pin to enter an alignment bore in said housing to align said connection on said body with an extending path to the outer surface of said housing.

12. The valve assembly of claim 9, wherein:
said body is secured to said housing with a threaded inner driver in the passage of said housing after insertion of said body in said housing.

13. The valve assembly of claim 11, wherein:
said connection on said body and said extending path on said housing are sealed on insertion of said body into said housing using at least one circumferentially split seal ring.

14. The valve assembly of claim 13, wherein:
said at least one circumferentially split seal ring comprises a plurality of concentric seal rings;
said circumferential splits in two said split rings are oriented away from each other.

15. The valve assembly of claim 13, wherein:
said circumferentially split seal rings defining opposed sealing legs that are pressed together between said body and said housing upon assembly of said body to said housing.

16. The valve assembly of claim 14, wherein:
said concentric circumferentially split seal rings comprise at least three split ring seals with the two outermost said split rings having their respective circumferential splits oriented open toward an outer surface of said body.

17. The valve assembly of claim 1, wherein:
said sealing between said flow tube and said body is accomplished with spaced seals;
movement of said movably mounted piston keeps said spaced seals in pressure balance with each other.

18. The valve assembly of claim 1, wherein:
said pressure compensation system enables a decrease in the wall thickness of said flow tube to resist burst or collapse, which enables greater production through said body, as compared to not having said pressure compensation system.

19. The valve assembly of claim 17, wherein:

said pressure balance between said seals minimizes seal friction to said body to reduce pressure needed for said hydraulic operation of said flow tube.

20. The valve assembly of claim 1, wherein:

said piston comprises a passage therethrough selectively covered by a breakable member that allows said passage to open when a predetermined pressure across said piston is reached.

21. The valve assembly of claim 1, wherein:

said piston is operably connected with a pressure relief device on opposed sides of said piston to relieve at a predetermined differential pressure across said piston in either direction.

22. A valve assembly that coverts a safety isolation valve to subsea use, said safety isolation valve comprising a body having a flowpath therethrough, said valve assembly comprising:

an outer housing comprising flanged end connections adapted to connect to a marine riser and a passage therethrough into which said body further comprising opposed ends is inserted with said flowpath nested in said passage and said opposed ends secured to said outer housing in said passage within said outer housing with a fastener independently of said end connections on said outer housing for attachment to said marine riser, said body sealingly secured to said housing by virtue of being inserted and secured in said passage of said outer housing so that at least one connection on said body for operation of a valve member is sealingly extended to an outer surface of said housing, said body protected by said housing from tensile, compressive and bending loads associated with subsea service acting on said housing.

23. The valve assembly of claim 22, wherein:

said body comprising at least one alignment pin to enter an alignment bore in said housing to align said connection on said body with an extending path to the outer surface of said housing.

24. The valve assembly of claim 22, wherein:

said body is secured to said housing with a threaded inner driver in the passage of said housing after insertion of said body in said housing energizing at least one seal between said body and said housing with no applied pressure in said housing.

25. A valve assembly that coverts a safety isolation valve to subsea use, said safety isolation valve comprising a body, the valve assembly comprising:

an outer housing comprising a passage therethrough into which said body is inserted, said outer housing comprising end connections for attachment to a tubular string, said body sealingly secured to said housing by virtue of being inserted and secured in said passage of said outer housing so that at least one connection on said body for operation of a valve member is sealingly extended to an outer surface of said housing, said body protected by said housing from tensile, compressive and bending loads associated with subsea service acting on said housing;

said body comprising at least one alignment pin to enter an alignment bore in said housing to align said connection on said body with an extending path to the outer surface of said housing;

said connection on said body and said extending path on said housing are sealed on insertion of said body into said housing using concentric circumferentially split seal rings.

26. The valve assembly of claim 25, wherein:

said circumferential splits in two said split rings are oriented away from each other.

27. The valve assembly of claim 25, wherein:

said circumferentially split seal rings defining opposed sealing legs that are pressed together between said body and said housing upon assembly of said body to said housing.

28. The valve assembly of claim 26, wherein:

said concentric circumferentially split seal rings comprise at least three split ring seals with the two outermost said split rings having their respective circumferential splits oriented open toward an outer surface of said body.

29. The valve assembly of claim 25, wherein:

said seal rings define a low pressure region between said body and said housing allowing pressure elsewhere in said housing to place an energizing force on said concentric circumferentially split seal rings.

30. A valve assembly that coverts a safety isolation valve to subsea use, said safety isolation valve comprising a body, the valve assembly comprising:

an outer housing comprising a passage therethrough into which said body is inserted, said outer housing comprising end connections for attachment to a tubular string, said body sealingly secured to said housing by virtue of being inserted and secured in said passage of said outer housing so that at least one connection on said body for operation of a valve member is sealingly extended to an outer surface of said housing, said body protected by said housing from tensile, compressive and bending loads associated with subsea service acting on said housing;

a pressure compensation system operable between a passage in said body and an isolated annular space between said valve member and said body, said pressure compensation system comprising a movably mounted piston between opposed stops with a pressure relief device that selectively opens if pressure differential across said piston exceeds a predetermined amount.

31. The valve assembly of claim 30, wherein:

said movably mounted piston retaining an incompressible fluid initially delivered to minimize volume of compressible fluid isolated by said movably mounted piston.

32. The valve assembly of claim 30, wherein:

said movably mounted piston comprises a floating piston.

* * * * *